United States Patent
Barker et al.

(10) Patent No.: US 9,242,307 B2
(45) Date of Patent: Jan. 26, 2016

(54) WELDING GUN WITH REDUCED COMPONENTS

(75) Inventors: Jim Barker, Corinth, TX (US); John Boisvert, Lebanon, NH (US)

(73) Assignee: Victor Equipment Company, Chesterfield, MO (US)

( * ) Notice: Subject to any disclaimer, the term of this patent is extended or adjusted under 35 U.S.C. 154(b) by 412 days.

(21) Appl. No.: 12/880,342

(22) Filed: Sep. 13, 2010

(65) Prior Publication Data

US 2011/0062130 A1  Mar. 17, 2011

Related U.S. Application Data

(60) Provisional application No. 61/241,885, filed on Sep. 12, 2009.

(51) Int. Cl.
- *B23K 9/10* (2006.01)
- *B23K 9/29* (2006.01)
- *B23K 9/32* (2006.01)

(52) U.S. Cl.
CPC .. *B23K 9/295* (2013.01); *B23K 9/32* (2013.01)

(58) Field of Classification Search
CPC ................................ B23K 9/295; B23K 9/32
USPC ......... 219/130.1, 136, 137.2, 137.31, 137.41, 219/137.42, 137.44, 137.51, 137.61, 219/137.62, 137.63, 137.9, 138–144, 131 F
See application file for complete search history.

(56) References Cited

U.S. PATENT DOCUMENTS

| | | | | |
|---|---|---|---|---|
| 3,629,547 A * | 12/1971 | Kester | ........................ | B23K 9/295 174/15.7 |
| 3,659,076 A * | 4/1972 | Ogden, Sr. | ............... | 219/137.42 |
| 3,836,747 A * | 9/1974 | Wlos | ........................ | 219/137.61 |
| 5,132,513 A | 7/1992 | Ingwersen et al. | | |
| 5,338,917 A * | 8/1994 | Stuart et al. | .............. | 219/137.63 |
| 5,380,980 A | 1/1995 | Colling | | |
| 5,491,321 A * | 2/1996 | Stuart et al. | .............. | 219/137.61 |
| 7,180,028 B2 * | 2/2007 | Flood et al. | ................. | 219/125.1 |
| 8,633,422 B2 * | 1/2014 | Giese | ........................ | 219/137.42 |
| 2007/0090168 A1 * | 4/2007 | Snow | ........................ | B23K 9/28 228/101 |

FOREIGN PATENT DOCUMENTS

| | | |
|---|---|---|
| DE | 29708396 | 8/1997 |
| WO | 2004052582 | 6/2004 |

OTHER PUBLICATIONS

PCT/US2010/048592 International Search Report.

* cited by examiner

*Primary Examiner* — Dana Ross
*Assistant Examiner* — Joseph Iskra
(74) *Attorney, Agent, or Firm* — Kacvinsky Daisak Bluni PLLC

(57) ABSTRACT

A welding gun is provided that includes a handle having forward and rear end portions and having a first passageway formed therethrough. A cable support tube having forward and rear end portions and a second passageway formed therethrough is secured to the handle at the forward end portion. A welding cable having a forward end portion and a rear end portion connected to a rear connector assembly extends from the rear end portion through the first and second passageways of the handle and the cable support tube to the forward end portion disposed within the forward end portion of the cable support tube.

23 Claims, 11 Drawing Sheets

WELDING GUN WITH REDUCED COMPONENTS

CROSS REFERENCE TO RELATED APPLICATIONS

This application is based upon U.S. Provisional Application No. 61/241,885, filed on Sep. 12, 2009 and entitled "Welding Gun with Reduced Components," the contents of which are incorporated herein by reference in their entirety and continued preservation of which is requested.

FIELD

The present disclosure relates generally to welding guns, and more particularly to welding guns such as MIG (Metal Inert Gas) welding guns having a reduced number of components.

BACKGROUND

The statements in this section merely provide background information related to the present disclosure and may not constitute prior art.

The present disclosure is directed to an improved welding gun and welding system particularly adapted for use in gas metal arc welding which is commonly referred to in the industry as MIG (Metal Inert Gas) or GMAW (Gas Metal Arc Welding) type welding. Generally, with GMAW welding, an inert gas is directed through the front end of the welding gun to provide a surrounding layer or blanket of shielding gas to protect a molten welding puddle that is generated during the welding process. The inert gas is typically a combination of various gases such as argon or helium, among others.

As well known to those skilled in the art, a gas metal arc welding gun typically receives electrical current, a supply of a shielding gas, and a wire electrode via a power cable. The power cable further includes a coaxial gas hose and wire guide located within the gas hose. The supply of the electrical current, the shielding gas, and the electrode wire is controlled by a trigger on the welding gun. By properly holding the welding gun and manipulating the trigger, an electrical arc is created between the free end of the electrode and the workpiece, and the welding operation is shielded from atmospheric contamination by the supplied shielding gas.

In a typical MIG welding gun, a conductor tube is secured to the front end of a welding gun handle and generally functions to conduct both electrical current and shielding gas, and also provides a conduit for feeding welding wire from a supply device (e.g., wire feeder) to the end of the conductor tube. The welding wire is then fed through an assembly of consumable components that are secured to the end of the conductor tube, including a diffuser, a contact tip, and a nozzle. Generally, the diffuser distributes a shield gas within the nozzle and around the welding wire to provide a shielded weld zone, the contact tip guides the welding wire through to the weld zone and also conducts current to the welding wire, and the nozzle houses the consumable components, delivers the shielding gas, and shields the other consumable components from weld spatter. Operation of a typical MIG welding gun, by way of example, is shown and described in U.S. Pat. Nos. 5,491,321 and 5,338,917, which are commonly owned with the present application, and the contents of which are incorporated herein by reference in their entirety.

Typically, a welding cable carries welding current, shielding gas, and welding wire to the MIG gun handle, wherein the welding cable attaches to a front connector block within the MIG welding gun handle via a mechanical connection. A conductor tube then carries the welding current from the front connector block to the consumable components. The front connector block, for example, provides an additional unnecessary component and mechanical junction within the MIG welding gun. Unnecessary components within the MIG welding gun affect the complexity and cost of the design in addition to elevated heat distributions due to higher electrical resistance.

SUMMARY

The present disclosure generally provides a MIG or GMAW welding gun and welding system simpler in design and more cost efficient than conventional welding guns and systems. Moreover, the various forms of the present disclosure provide a more uniform heat distribution and improved heat dissipation due to the reduced number of components and mechanical junctures disposed within the welding gun.

In one form, a welding gun comprises a handle having forward and rear end portions and a first passageway formed therethrough. A cable support tube having forward and rear end portions and a second passageway formed therethrough is secured to the handle at the forward end portion. A welding cable having a forward end portion and a rear end portion connected to a rear connector assembly extends from the rear end portion through the first and second passageways of the handle and the cable support tube to the forward end portion disposed within the forward end portion of the cable support tube.

In another form, a welding system comprises an electrical welding power source and a welding cable coupled to the electrical power source. The welding cable has a forward end portion and a rear end portion coupled to the electrical power source. A welding gun is coupled to the welding cable. The welding gun comprises a handle having forward and rear end portions and a first passageway formed therethrough. A cable support tube having forward and rear end portions and a second passageway formed therethrough is secured to the handle at the forward end portion. The welding cable extends through the first and second passageways of the handle and the cable support tube. The forward end portion of the welding cable is disposed within the forward end portion of the cable support tube.

In still another form, a cable support assembly for a welding gun is provided. The cable support assembly comprises a cable support tube for receiving a welding cable therein, and the cable support tube defines a distal face. An insulator sleeve is disposed in the cable support tube and includes a distal end flange protruding from the distal face of the cable support tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
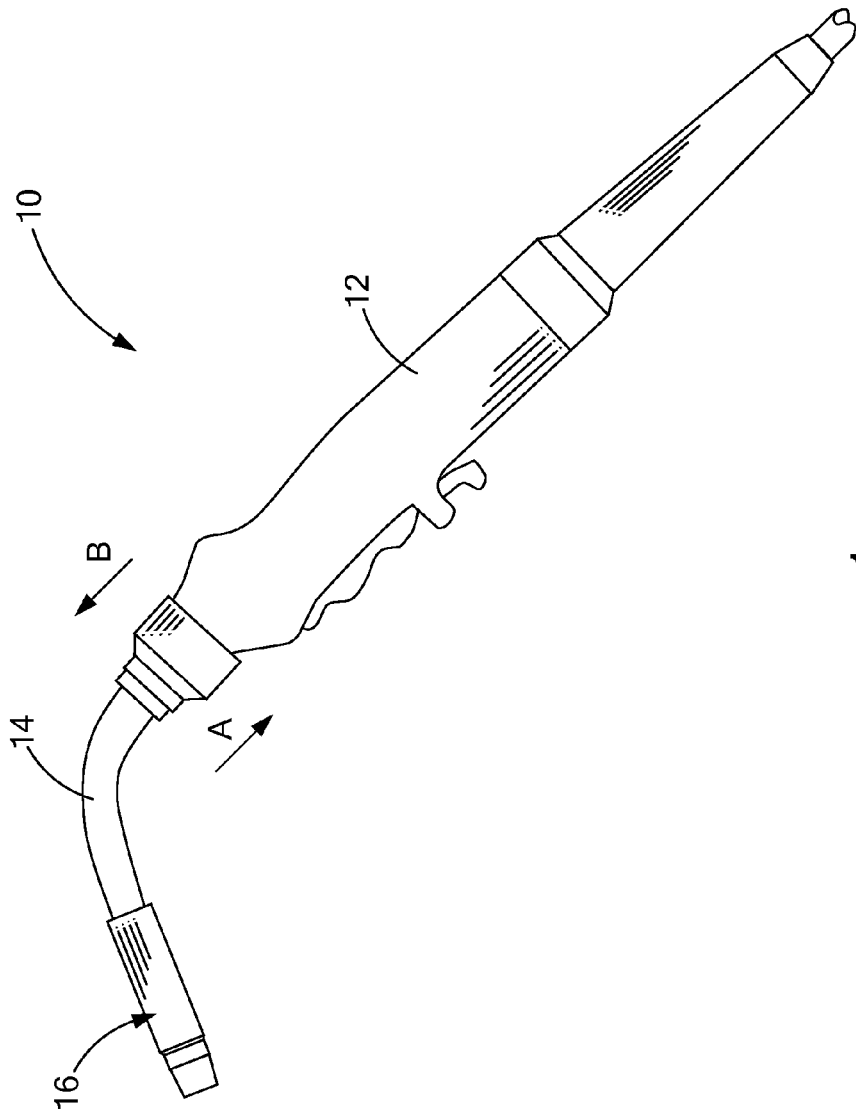
FIG. 1 is a side view of a typical MIG welding gun known in the art.

The following description is merely exemplary in nature and is in no way intended to limit the present disclosure or its application or uses. It should be understood that throughout the description and drawings, corresponding reference numerals indicate like or corresponding parts and features. And although the term "MIG" is used throughout, it should be understood that the teachings of the present disclosure apply to any type of welding gun, including MIG and GMAW, among others.

Referring to FIG. 1, a typical MIG welding gun is illustrated and generally indicated by reference numeral 10. The MIG welding gun 10 comprises a welding gun handle 12, a conductor tube 14 secured to the welding gun handle 12, and a set of consumables 16 secured a distal end of the conductor tube 14. The set of consumables 16 generally include a nozzle, a diffuser, and a contact tip (not shown in FIG. 1), the exemplary operation of which are described in greater detail in U.S. Pat. Nos. 5,491,321 and 5,338,917, which are commonly owned with the present application, and the contents of which are incorporated herein by reference in their entirety.

Figure 2:
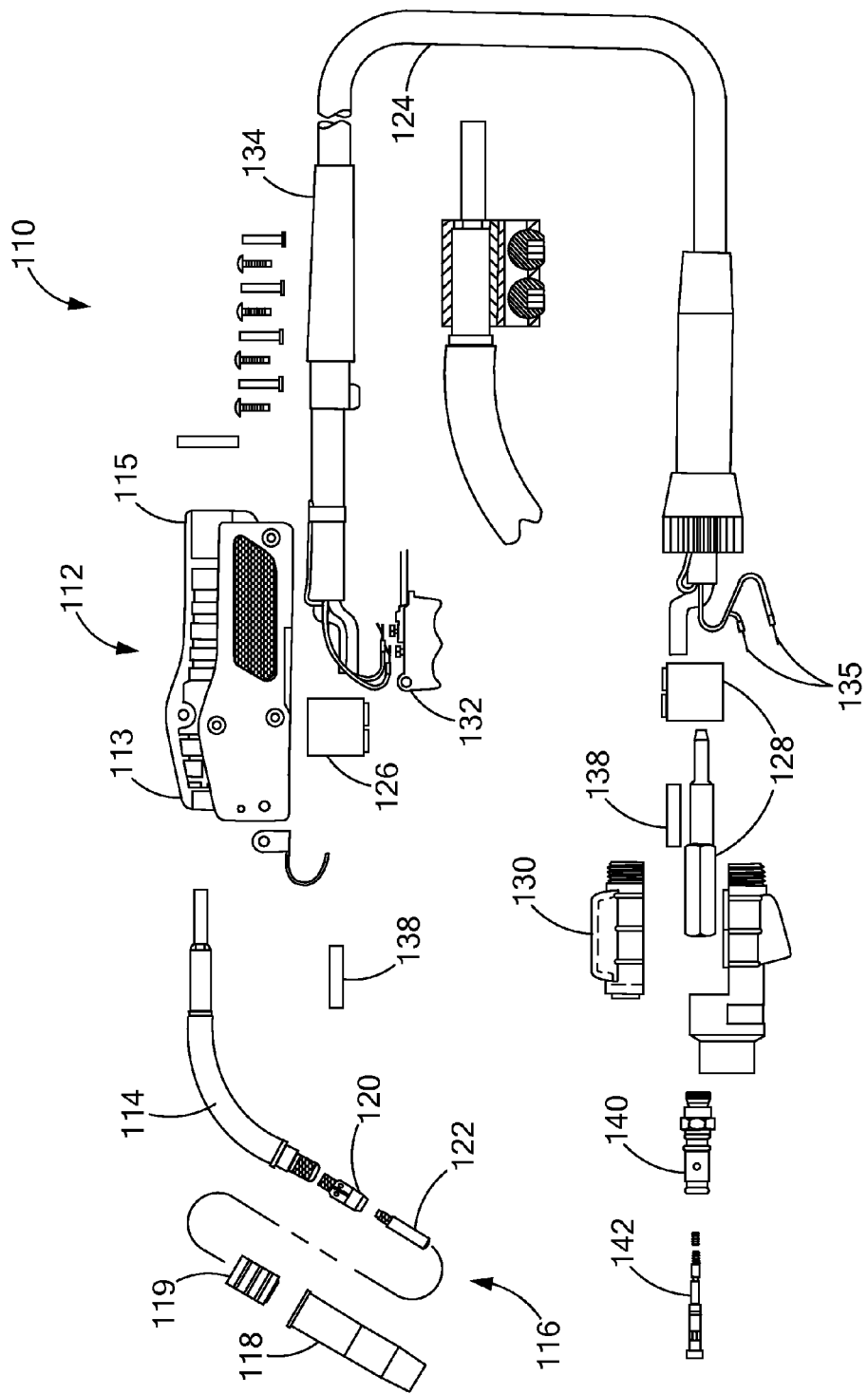
FIG. 2 is an exploded side view of another typical MIG welding gun known in the art.

Referring to FIG. 2, another example of a typical MIG welding gun is illustrated and generally indicated by reference numeral 110. The MIG welding gun 110 comprises a welding gun handle 112, a conductor tube 114 attachable to the welding gun handle 112 at a forward end portion 113 thereof, and a set of consumables 116 attachable to a forward end portion of the conductor tube 114. The set of consumables 116 generally includes a nozzle 118, a nozzle insulator 119, a gas diffuser 120, and a contact tip 122. As shown in FIG. 2, a welding cable 124 is attachable to the welding gun handle 112 at a rear end portion 115 thereof. The cable 124 carries the welding current, shielding gas, and welding wire to the MIG gun 110.

As illustrated, the cable 124 is typically attached to front and rear connector blocks 126 and 128 via a mechanical connection or a crimp style connection. The front and rear connector blocks or connections 126 and 128 join the cable 124 to the rigid portion of the MIG gun 110 at both ends. The front and rear connector blocks 126 and 128 are also typically used for the attachment points for the handle 112 and rear case assembly 130. In this form, the conductor tube 114 carries all of the welding current from the front connector block 126 to the gas diffuser 120 and contact tip 122.

As further illustrated in FIG. 2, the typical MIG welding gun includes a trigger assembly 132 for actuating the electrical welding power supply. Proximate the rear end portion 115 of the handle 112 is a strain relief 134 to prevent kinking of the cable 124 during articulation. Copper separators 138 provide an intimate connection between the cable 124 and the conductor tube 114 by filling an interstitial space created by having two round objects placed side by side in an oblong slot. (Not shown). The cable 124 is connected between the rear case assembly 130 and the handle 112 and a rear connector plug 140 extends rearwardly from the rear case assembly 130 for connection to an adaptor or conduit assembly 142 or directly to a welding power source. The rear connector plug 140 is formed of a conductive material to transfer electrical current from the welding power source.

Figure 3:
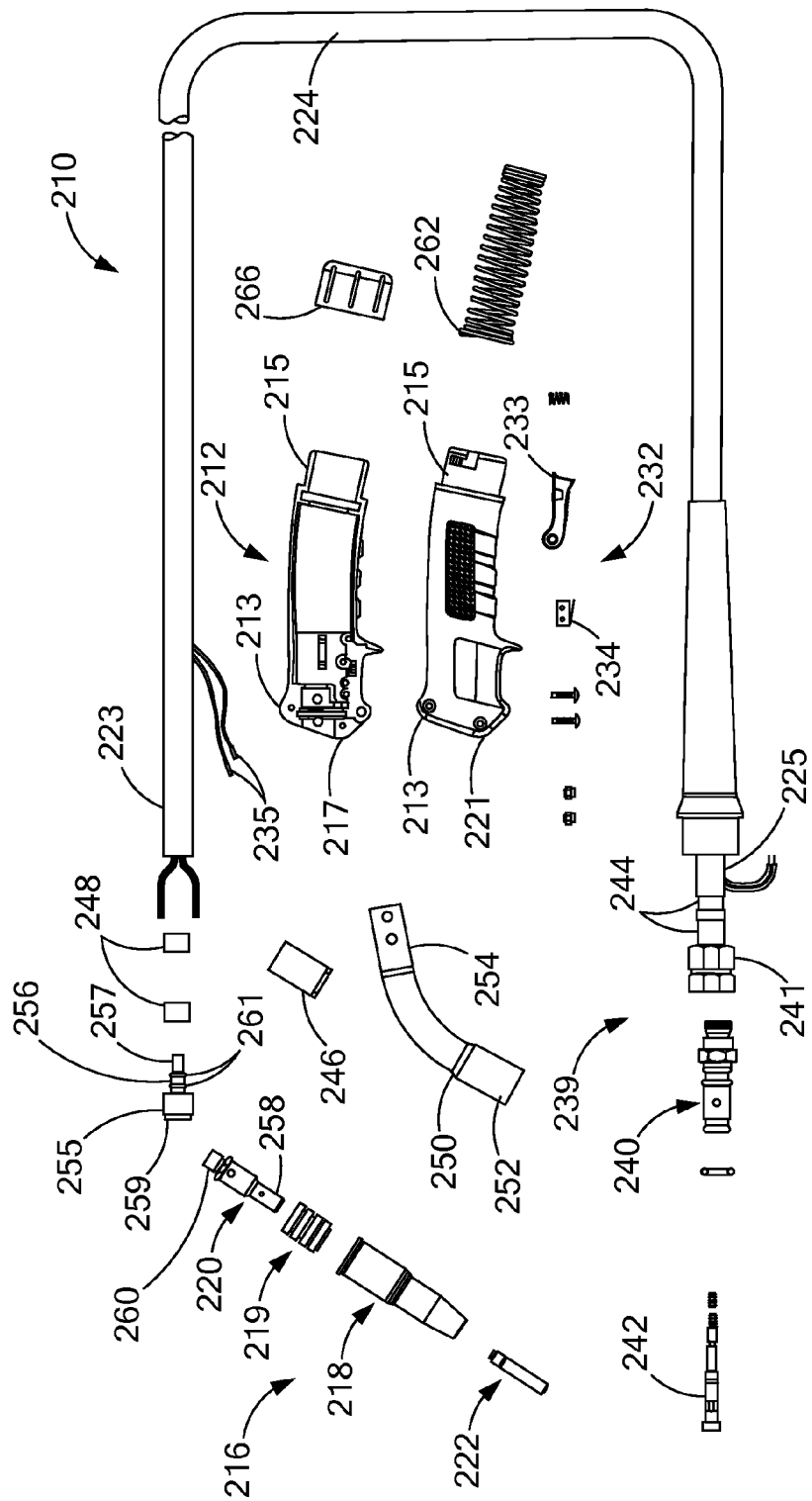
FIG. 3 is an exploded side view of a MIG welding gun in accordance with the teachings of the present disclosure.

Various forms of the present disclosure comprise an improved MIG welding gun having a reduced number of components in comparison to typical MIG welding guns such as those illustrated and described with respect to FIGS. 1-2. Referring to FIG. 3, one form of a MIG welding gun in accordance with the teachings of the present disclosure is illustrated and generally indicated by reference numeral 210. The MIG welding gun 210 comprises a welding gun handle 212 having a forward end portion 213 and a rear end portion 215. The right and left halves 217 and 221 of the handle 212 attach together and define a passageway formed through the handle 212.

In this form, a flexible welding cable 224 carrying welding current, shielding gas, and welding wire to the MIG gun 210 is attachable within the handle 212. In one form, the cable 224 defines a flexible passageway which houses a gas conduit (not shown), which conducts a shielding gas from an external gas source to the welding gun 210, power conductors or conductive stranding, typically fashioned from copper strands and sufficient for carrying large amounts of arc welding current, a welding electrode wire, and control lead wires 235. Distinct from the prior art MIG welding guns 10 and 110 of FIGS. 1 and 2, wherein the forward end portion of the cable is typically attached to a conductor tube by a front connector block and the rear end portion of the cable is attached to a power supply by a rear connector block, the MIG gun 210 does not include a front connector block.

Elimination of the front connector block and the conventional conductor tube within the MIG gun 210 thus reduces the number of mechanical connections at the front end of the MIG gun 210, which is where most of the heat is generated. Moreover, as further illustrated in FIG. 3, the MIG gun 210 does not include a conductor tube, the various copper separators, the rear case, or many of the other components as shown in the prior art MIG gun 110 of FIG. 2. Rather, the rear end portion 225 of the cable 224 is attached directly to a rear connector assembly 239 and the forward end portion 223 of the cable 224 extends entirely through the length of the handle 212 and is attached to the gas diffuser 220. As illustrated in FIG. 3, the rear connector assembly 239 includes a rear connector 241 configured to receive a rear connector plug 240 which conducts the welding electrical current and receives the welding wire and the inert gas therethrough. The rear connector assembly 239 is designed to be received on the rear end portion 225 of the cable 224 by a set of rear crimp sleeves 244. The rear connector plug 240 extends rearwardly form the rear connector 241 for connection to an adaptor or conduit assembly 242 or directly to the welding power source. The rear connector plug 240 is formed of a conductive material to transfer electrical current from the welding power source.

Thus, since the cable 224 extends through the length of the handle 212 to the gas diffuser 220, there is no need for a conductor tube as used in prior art MIG guns. As illustrated in FIG. 3, a cable support tube 250, in the form of a copper gooseneck tubular housing in one form of the present disclosure, is secured to the forward end portion 213 of the handle 212. The cable support tube 250 has a forward end portion 252 and a rear end portion 254 and defines a passageway formed therethrough. The rear end portion 254 of the cable support tube 250 is secured to the forward end portion 213 of the handle 212 by any suitable means known in the art. Since the cable 224 already provides a flexible conduit for feeding the welding wire from a supply device to the consumable components 216 and carrying the welding current to the consumable components 216, there is no need for a conventional conductor tube. Thus, the cable support tube 250 does not perform the function of the conductor tubes of the prior art, but is provided to support the cable 224, i.e., to provide rigidity to the flexible cable 224. The cable support tube 250 effectively acts as an aesthetic conductor tube, providing rigid support to the cable 224 without performing the function of the conductor tubes of the prior art MIG guns.

As illustrated in FIG. 3, the set of consumables 216 generally includes a nozzle 218, a nozzle insulator 219, a gas diffuser 220, and a contact tip 222, the exemplary operation of which are described in greater detail in U.S. Pat. Nos. 5,491,321 and 5,338,91 as noted above. The gas diffuser 220 is formed of an electrically conductive material and is used to transfer the shielding gas from the inner passageway of the cable 224 to the nozzle 218. The gas diffuser 220 also transfers welding current to the contact tip 222, and in some cases engages with the nozzle 218. The contact tip 222 is part responsible for transferring the welding current from the MIG gun 210 to the welding wire. The contact tip 222 is subject to high heats and continual abrasion and is typically comprised of copper. The nozzle 218 shields the contact tip 222 and gas diffuser 220 from inadvertent contact with the grounded work piece, as well as channeling the shielding gas to the welding puddle. The nozzle insulator 219 is disposed between the diffuser 220 and the nozzle 218.

In this form, the gas diffuser 220 has a forward end portion 258 and a rear end portion 260 operatively associated with the forward end portion 223 of the welding cable 224. As illustrated in FIG. 3, a diffuser adapter 256 is disposed between the forward end portion 223 of the welding cable 224 and the gas diffuser 220. The diffuser adapter 256 has a forward end portion 255 and a rear end portion 257 and defines a channel 259 for receiving at least a portion of the gas diffuser 220. The diffuser adapter 256 in one form includes a knurled section 261 that allows the diffuser adapter 256 to be retained on the forward end portion 223 of the cable 224 by a set of crimp sleeves 248. As shown in FIG. 3, the diffuser adapter 256 secures the cable 224 for placement within the cable support tube 250. The diffuser adapter 256 is configured to receive the gas diffuser 220 and thus secures the gas diffuser 220 to the welding cable 224. An insulator sleeve 246 is configured to be disposed over the diffuser adapter 256 to provide insulation between the cable support tube 250 and the gas diffuser 220. The gas diffuser 220 defines an elongate channel sized to receive at least a portion of the contact tip 222, wherein the contact tip 222 in one form is threadingly retained on the forward end portion 258 of the gas diffuser 220. Electrical current is transferred to the welding wire through the contact tip 222.

The MIG gun 210 further includes a trigger assembly 232 disposed within the handle 212. The trigger assembly 232 includes a trigger member 233 movable between actuated and non-actuated positions to engage and disengage a trigger switch 234 to control the flow of power from the electrical power source. The trigger switch 234 is operable with control lead wires 235 to actuate the welding power supply. The trigger assembly 232 may include any suitable trigger assembly known by one of skill in the art to actuate the welding power supply. Exemplary trigger assemblies are described in greater detail in U.S. Pat. Nos. 5,491,321 and 5,338,917, which are commonly owned with the present application, and the contents of which are incorporated herein by reference in their entirety. In one form, the lead wires 235 may exit the cable 224 within the handle 212 to connect to the trigger switch 234 and then reenter the cable 224. In another form, the trigger switch 234 may be embedded within the cable 224 and a plunger or actuator operatively connected to the handle 212 may be engaged to provide the requisite electrical contact. (Not shown).

As shown in FIG. 3, the MIG gun 210 further includes a strain relief 262 attached to the rear end portion 215 of the handle 212 to prevent kinking of the cable 224. The cable 224 feeds into the strain relief 262 which is connected by a sleeve within the end cap 266.

Figure 4:
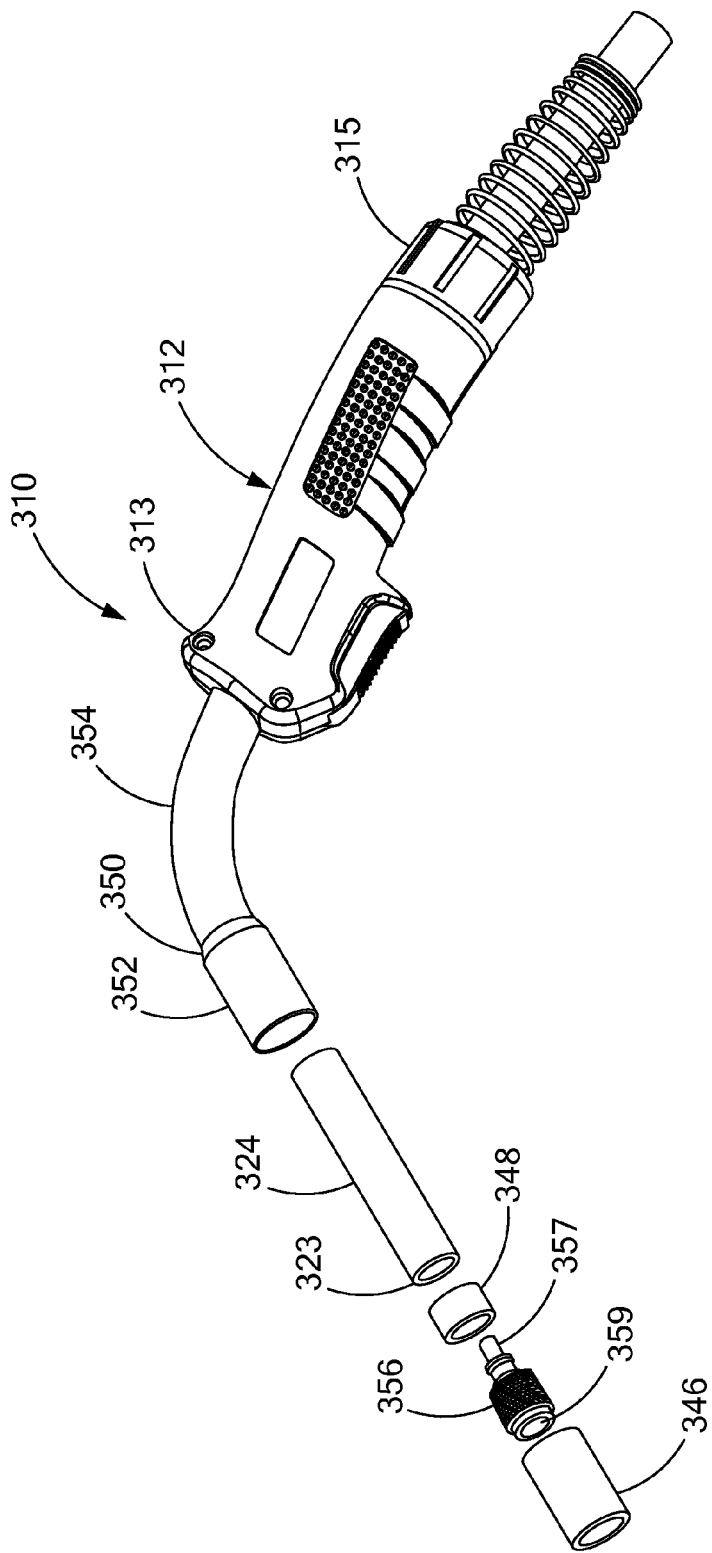
FIG. 4 is an exploded perspective view of a MIG welding gun in accordance with further teachings of the present disclosure.

Referring now to FIGS. 4-7, another form of a MIG welding gun in accordance with further teachings of the present disclosure is illustrated and generally indicated by reference numeral 310. The MIG welding gun 310 is similar to that in FIG. 3, wherein similar components are denoted by similar reference numerals increased by 100. As illustrated in FIGS. 4-7, the cable support tube 350 includes a passageway configured to receive the welding cable 324 such that the forward end portion 323 of the welding cable 324 is disposed within the forward end portion 352 of the cable support tube 350. The rear end portion 354 of the cable support tube 254 is connected to the forward end portion 313 of the handle 312. For illustration purposes, only a portion of the cable 324 is shown in FIG. 4.

Figure 6:
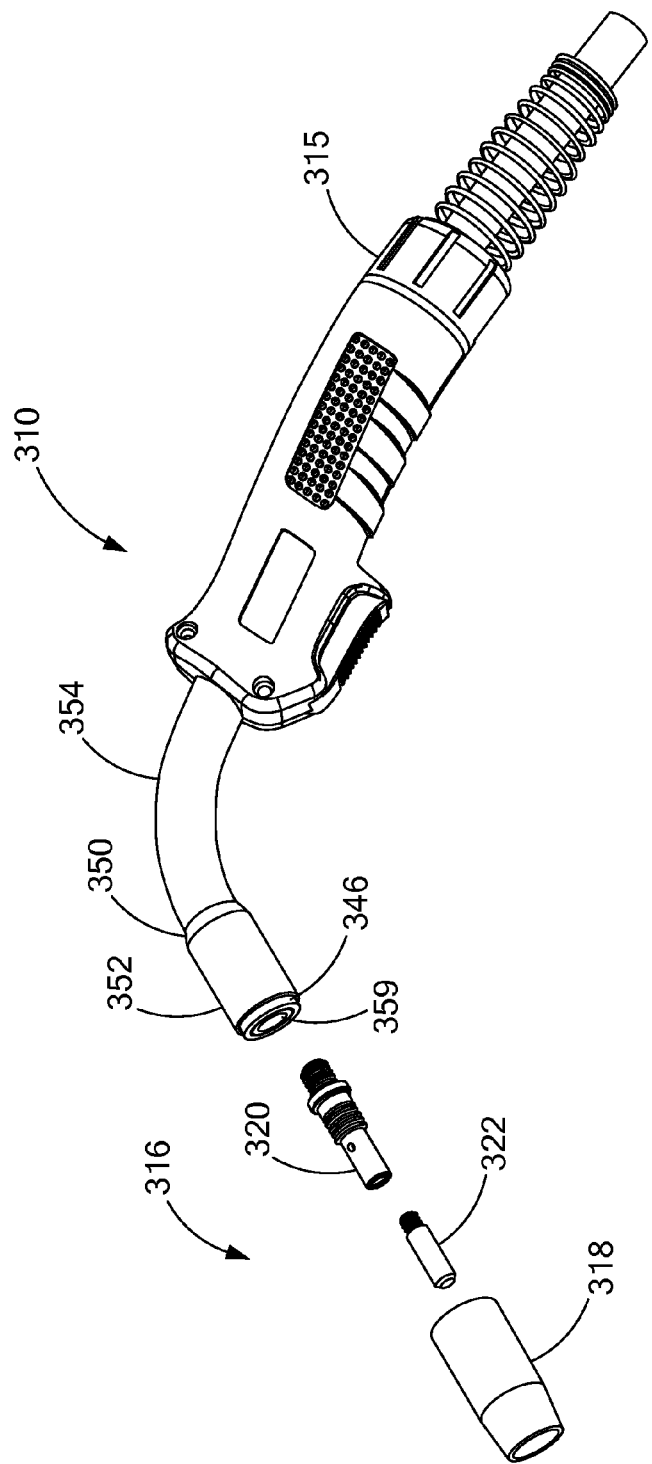
FIG. 6 is another perspective view of the MIG welding gun of FIG. 4, shown with a set of consumables in an exploded perspective view.
Figure 7:
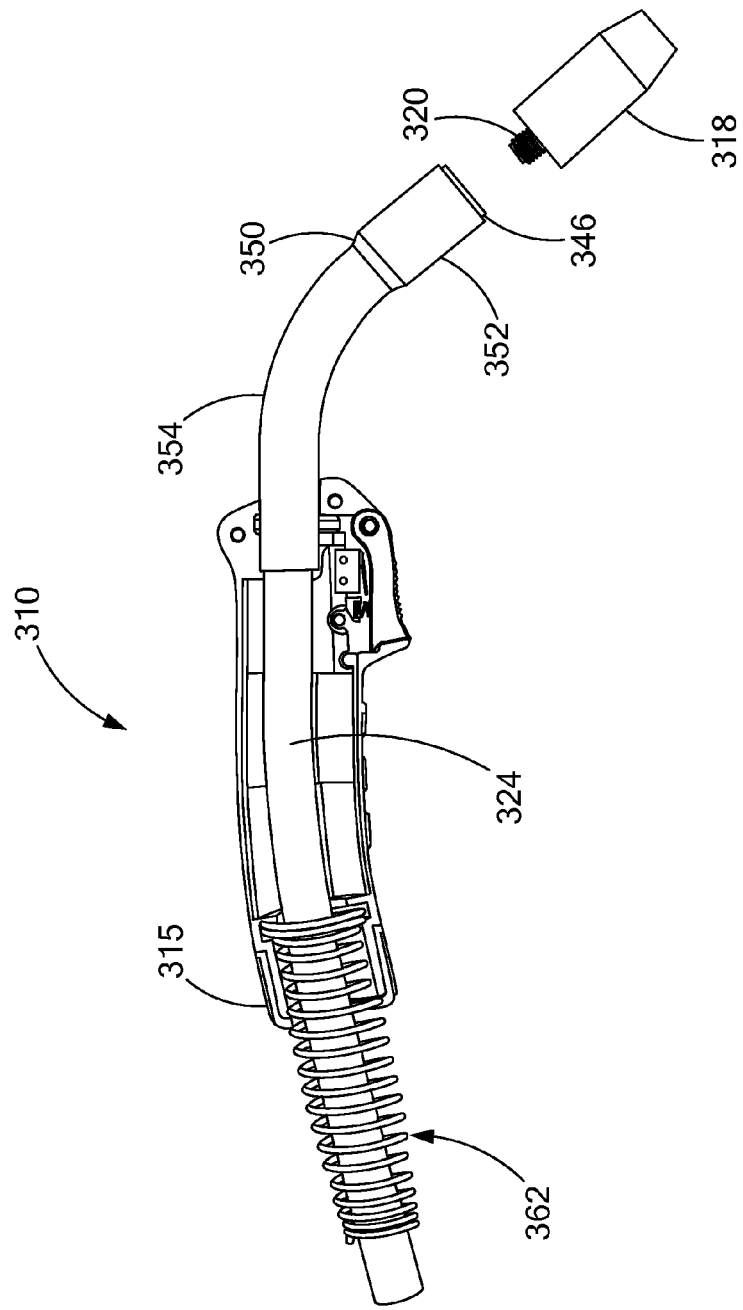
FIG. 7 is a partial cross-sectional view of the MIG welding gun of FIG. 4.

As further shown in FIG. 4, the diffuser adapter 356 is received within the passageway of the cable 324 and in one form includes a knurled section 357 that allows the diffuser adapter 356 to be retained on the forward end portion 323 of the welding cable 324 in such a manner so as to provide a fluid tight gas seal, for example, via the brass ring 348. The diffuser adapter 356 secures the welding cable 324 for placement within the cable support tube 350. The diffuser adapter 356 is configured to receive the gas diffuser 320 and secure the gas diffuser 320 to the welding cable 324. Further illustrated in FIGS. 4-7 is an insulator sleeve 346 configured to be disposed over diffuser adapter 356 to provide insulation between the cable support tube 350 and the gas diffuser 320. The gas diffuser 320 defines an elongate channel sized to receive at least a portion of the contact tip 322, wherein the contact tip 322 in one form is threadingly retained on the forward end portion 258 of the gas diffuser 320. Electrical current is transferred to the welding wire through the contact tip 322. (FIGS. 6-7).

Figure 4A:
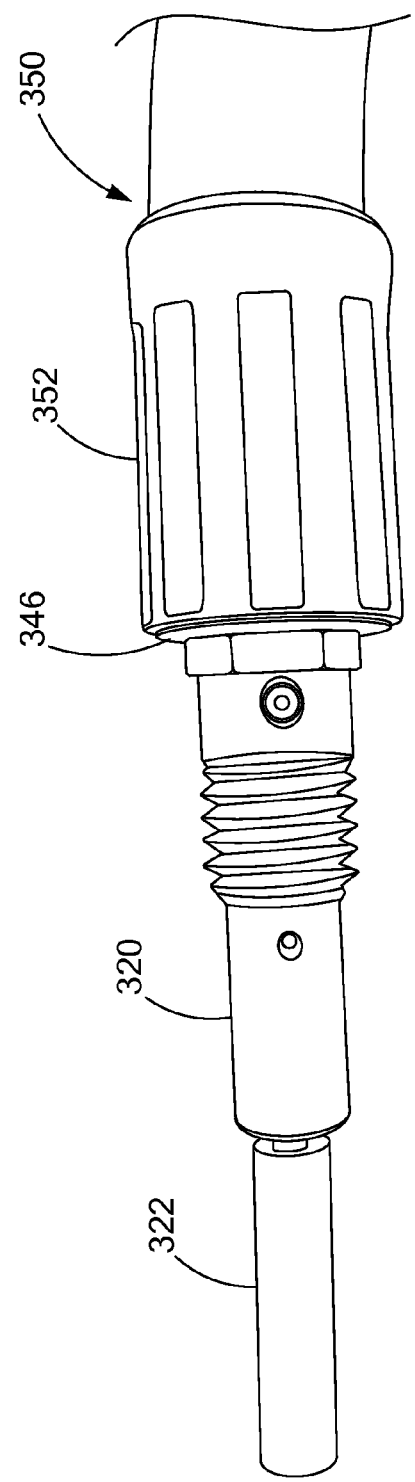
FIG. 4a is a perspective view of a cable support tube crimped over an insulator sleeve in accordance with the teachings of the present disclosure.
Figure 4B:
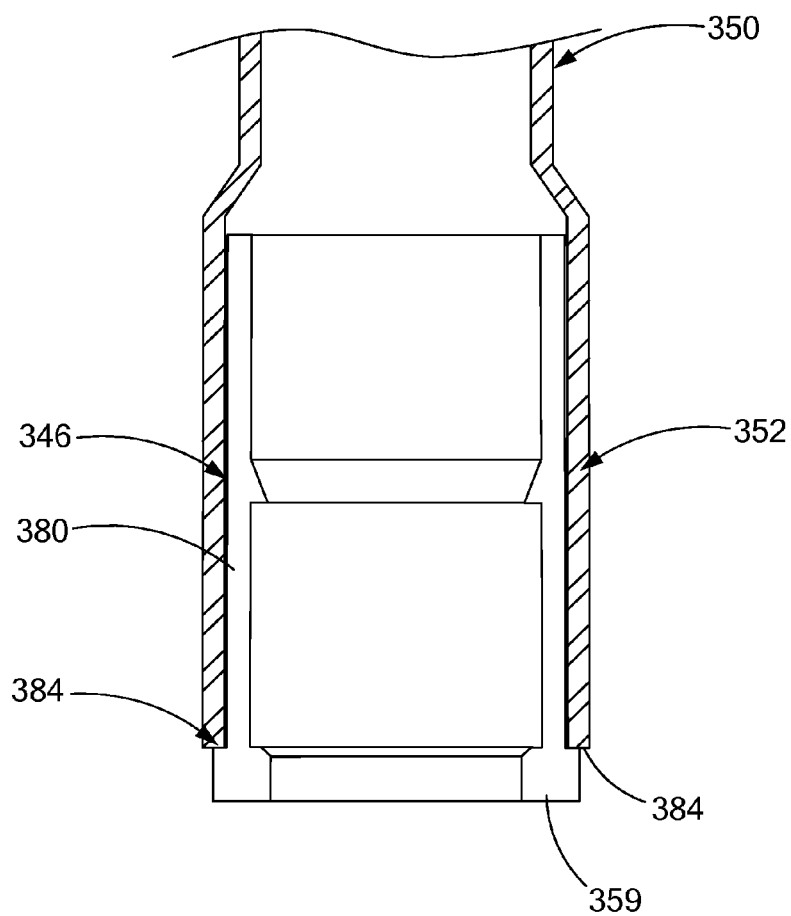
FIG. 4b is a cross-sectional view of an alternate form of an insulation sleeve received in a forward end portion of a cable support tube in accordance with the teachings of the present disclosure.
Figure 5:
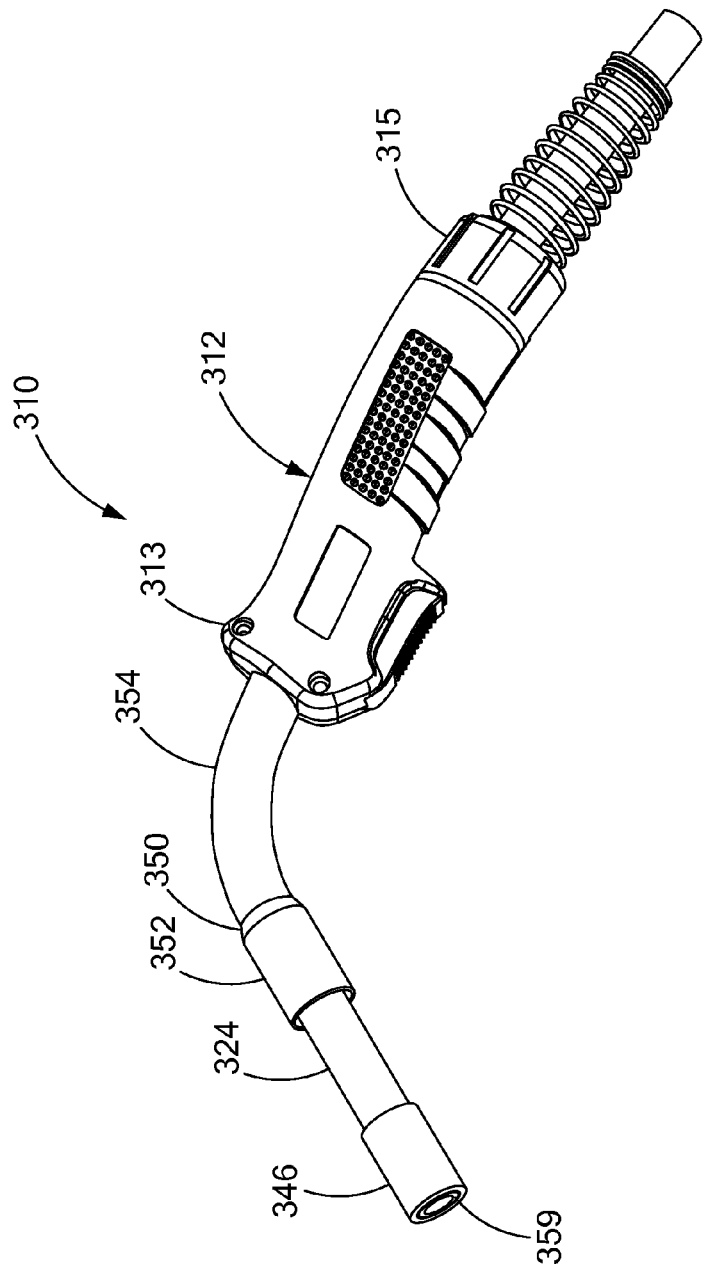
FIG. 5 is another exploded perspective view of the MIG welding gun of FIG. 4.

Additionally, as shown in FIG. 4a, the cable support tube 350 is crimped round the insulator sleeve 346 around its forward end portion 352 in one form of the present disclosure. Furthermore, FIG. 4b shows a cross-section through the forward end portion 352 to show connection between the insulator sleeve 346 and the forward end portion 352. The insulator sleeve 346 includes a cylindrical wall 380 and a distal end flange 359. The distal end flange 359 has an annular configuration and has an outside diameter greater than that of the cylindrical wall 380 to define an outer shoulder 382 between the cylindrical wall 380 and the distal end flange 359. The forward end portion 352 includes a distal face 384 abutting against the outer shoulder 382. The distal end flange 359 protrudes forwardly from the distal face 384 of the forward end portion 352 of the cable support tube 350 for improved insulation.

This structure insures against creating an electrically conductive path between the cable support tube 350 and any conductive material inside the insulator sleeve 346 due to damage to the forward end portion 352 of the cable support tube 350. It is not uncommon for an operator to slam or hit the MIG welding gun against a workbench or other surfaces to remove spatter or debris. In a typical MIG welding gun, the outer metal jacket is configured as a relatively thin wall and is prone to damage and deformation when the MIG welding gun is slammed. The damage to or deformation of the outer metal jacket may reach a point that the copper conductor tube inside an insulation sleeve comes into contact with the outer metal jacket, thereby creating an electrically conductive path to the outside of the MIG gun and potentially injuring an operator.

The insulation sleeve 346 of the present disclosure alleviates this problem since any deformation of the cable support tube 350 would be absorbed by the insulation sleeve itself. Furthermore, with the distal end flange 359 protruding from the distal face 384 of the forward end portion 352 of the cable support tube 350, the cable support tube 350 is inhibited from severe deformation and damage and is less likely.

As best illustrated in FIG. 7, the welding cable 324 extends through the length of the handle 312 and the cable support tube 350 to connect to the diffuser 320, thus alleviating the need for a conductor tube and the necessary mechanical connections associated therewith between a cable and a conductor tube.

Further illustrated in FIG. 7, is a strain relief 362 proximate the rear end portion 315 of the handle 312 to prevent kinking of the cable 324 during articulation. As shown, the cable 324 feeds into the strain relief 362 and is connected to the rear end portion 315 of the handle 312.

Figure 8:
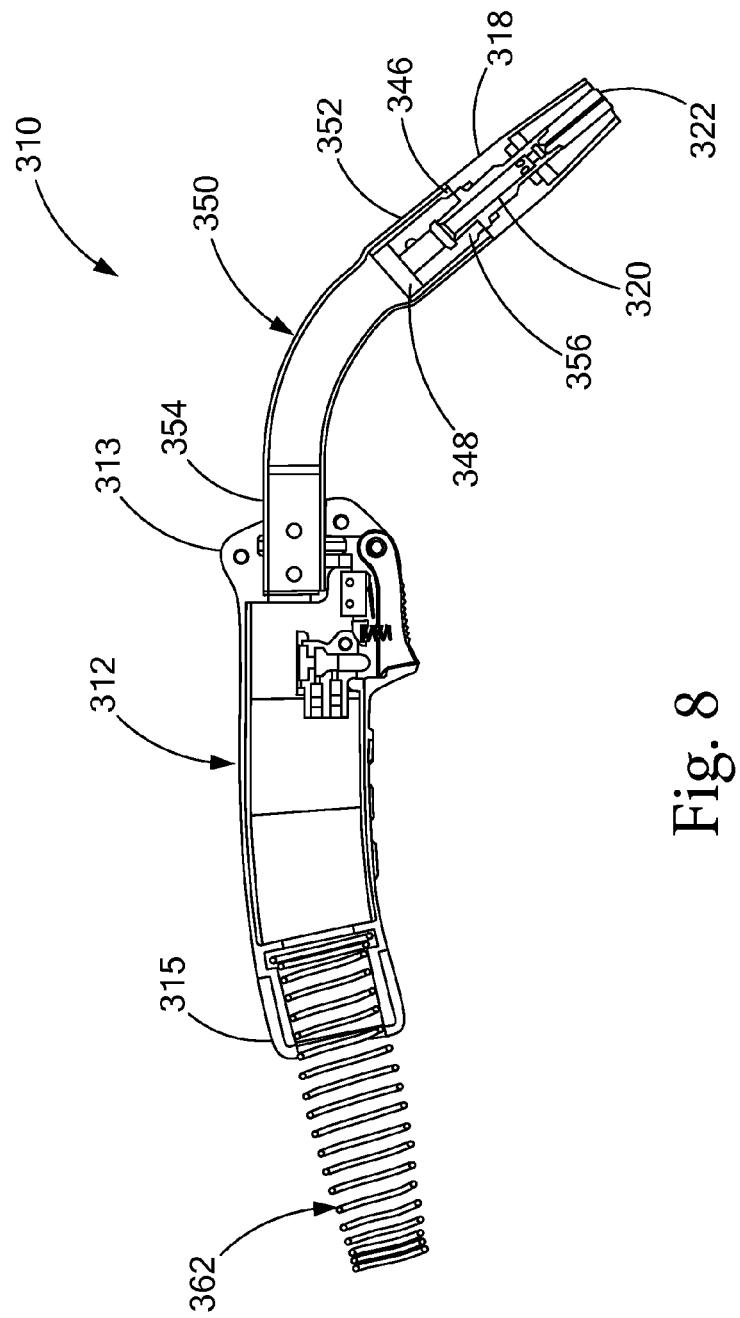
FIG. 8 is a partial cross-sectional view of the MIG welding gun of FIG. 4.

Referring to FIG. 8, the connections among the cable support tube 350, the gas diffuser 320, the diffuser adaptor 356, and the nozzle 318 are clearly shown. The diffuser adaptor 356 is received in the forward end portion 352 of the cable support tube 350. The insulator sleeve 346 surrounds the diffuser adaptor 356 and is disposed between the diffuser adaptor 356 and the forward end portion 352. The diffuser adaptor 320 includes a rear end secured to the brass ring 348 and a forward end defining a cavity to receive a part of the gas diffuser 320. The contact tip 322 is secured to the gas diffuser 322. The nozzle 318 houses the gas diffuser 320 and the contact tip 322 to protect the consumables therein.

Figure 9:
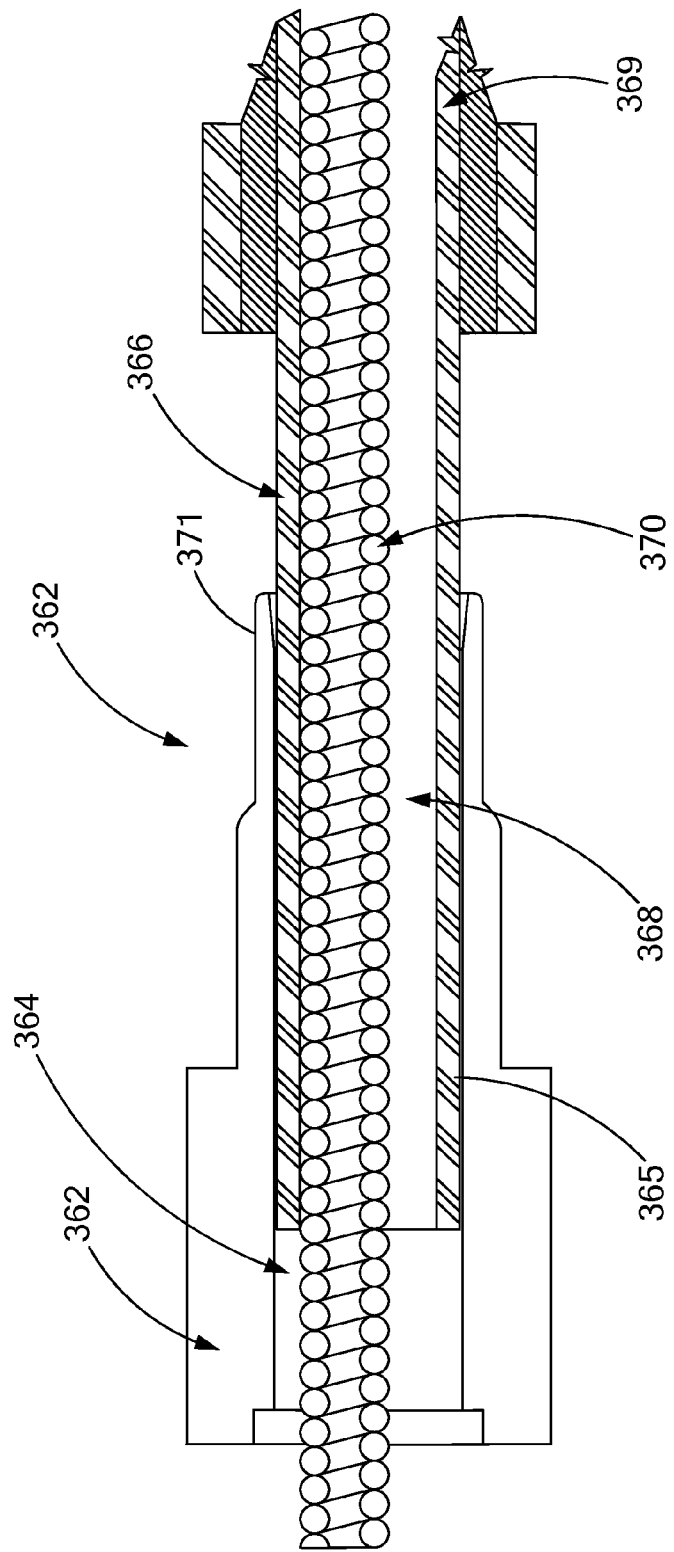
FIG. 9 is partial cross-sectional view of an alternate form of a diffuser adaptor assembled to the cable support tube in accordance with the teachings of the present disclosure.

Referring to FIG. 9, an alternate form of a diffuser adaptor 360 is shown to include a forward member 362 secured to the diffuser 320 (not shown). The forward member 362 and the gas passage hose 366 have a tubular configuration. The forward member 362 defines a passageway 364 and the gas passage hose 366 defines a passageway 368. The gas passage hose 366 has a forward end portion 365 and a rear end portion 369. The forward end portion 365 of the gas passage hose 366 has an outside diameter slightly smaller than the size of the passageway 364 so that the forward end portion 365 of the gas passage hose 366 can be inserted into the passageway 364 of the forward member 362. The rear end portion 369 of the gas passage hose 366 extends rearwardly from the rear end portion 371 of the forward member 362. A welding wire feed conduit 370 for guiding a welding wire (not shown) from the handle 312 (FIG. 8) through the contact tip 322 (FIG. 8) is disposed in the passageway 368 of the gas passage hose 366. With this configuration, the welding wire feed conduit 370 can be moved forwardly or rearwardly without obstruction. The welding wire feed conduit 370 may be pushed rearwardly toward the handle 312 during operation. The diffuser adaptor 360 of the present disclosure allows the welding wire feed conduit 370 to move forwardly and rearwardly without obstruction and return to its normal operating position after it is dislodged.

Not only do the improved MIG welding guns of the present disclosure provide a simpler design having a reduced number of components and reduced cost, the MIG welding guns of the present disclosure provide a more effective heat transfer rearward through the cable resulting in cooler operation of the contact tip due to fewer mechanical junctures within the MIG welding guns.

The present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. A welding gun comprising:
 a handle having forward and rear end portions and having a first passageway formed therethrough;
 a cable support tube having forward and rear end portions and having a second passageway formed therethrough, the rear end portion of the cable support tube secured to the forward end portion of the handle; and
 a welding cable having forward and rear end portions, the rear end portion of the welding cable connected to a rear connector assembly for connecting to a power source, the welding cable extending through the first passageway of the handle and the second passageway of the cable support tube to the forward end portion of the cable support tube;
 a gas diffuser having a forward end portion and a rear end portion operatively associated with the forward end portion of the welding cable; and
 a diffuser adapter disposed between the forward end portion of the welding cable and the gas diffuser, the diffuser adapter having forward and rear end portions and defining a channel for receiving at least a portion of the gas diffuser and securing the gas diffuser to the welding cable.

2. The welding gun according to claim 1, the gas diffuser formed of an electrically conductive material.

3. The welding gun according to claim 1, wherein the diffuser adapter secures the welding cable for placement within the cable support tube.

4. The welding gun according to claim 1, wherein the diffuser adapter further comprises annular ridges that are crimped such that the diffuser adapter is retained on the forward end portion of the welding cable, and wherein the gas diffuser is threadingly retained on the forward end portion of the diffuser adapter.

5. The welding gun according to claim 2, further comprising a contact tip threadingly retained on the forward end portion of the gas diffuser, the gas diffuser defining an elongate channel therethrough sized to receive at least a portion of the contact tip therein.

6. The welding gun according to claim 1, wherein the welding cable defines a third passageway formed therethrough, wherein the third passageway houses a welding electrode wire, a gas conduit, conductive stranding, and control lead wires.

7. The welding gun according to claim 1, further comprising a trigger assembly disposed within the handle, the trigger assembly including a trigger member movable between actuated and non-actuated positions to engage and disengage a trigger switch to control the flow of welding power from an electronic power supply.

8. The welding gun according to claim 1, further comprising a strain relief attached to the rear end portion of the handle and configured to receive the cable to prevent kinking of the cable.

9. A welding system comprising:
an electrical power source;
a welding cable coupled to the electrical power source, the welding cable having a forward end portion and a rear end portion coupled to the electrical power source; and
a welding gun coupled to the welding cable, the welding gun comprising:
  a handle having forward and rear end portions and having a first passageway formed therethrough;
  a cable support tube having forward and rear end portions and having a second passageway formed therethrough, the cable support tube secured to the handle at the forward end portion of the handle, wherein the welding cable extends through the first passageway of the handle and the second passageway of the cable support tube, the forward end portion of the welding cable being disposed within the forward end portion of the cable support tube;
  a gas diffuser having a forward end portion and a rear end portion operatively associated with the forward end portion of the welding cable; and
  a diffuser adapter disposed between the forward end portion of the welding cable and the gas diffuser, the diffuser adapter having forward and rear end portions and defining a channel for receiving at least a portion of the gas diffuser and securing the gas diffuser to the welding cable.

10. The welding system according to claim 9, wherein the diffuser adapter secures the welding cable for placement within the cable support tube.

11. The welding system according to claim 9, wherein the diffuser adapter further comprises annular ridges that are crimped such that the diffuser adapter is retained on the forward end portion of the welding cable, and wherein the gas diffuser is threadingly retained on the forward end portion of the diffuser adapter.

12. The welding system according to claim 9, further comprising a contact tip threadingly retained on the forward end portion of the gas diffuser, the gas diffuser defining an elongate channel therethrough sized to receive at least a portion of the contact tip therein.

13. The welding gun according to claim 9, wherein the welding cable defines a third passageway formed therethrough, wherein the third passageway houses a welding electrode wire, a gas conduit, conductive stranding, and control lead wires.

14. The welding system according to claim 9, further comprising a trigger assembly disposed within the handle, the trigger assembly including a trigger member movable between actuated and non-actuated positions to engage and disengage a trigger switch to control the flow of power from the electrical power source.

15. The welding system according to claim 9, further comprising a strain relief proximate the rear end portion to prevent kinking of the cable.

16. The welding system according to claim 9, wherein the welding cable is coupled to the electrical power source via a rear connector assembly.

17. A cable support assembly for a welding gun, comprising:
a cable support tube for receiving a welding cable therein, the cable support tube defining a distal face; and
an insulator sleeve disposed in the cable support tube and including a distal end flange protruding from the distal face of the cable support tube;
a gas diffuser having a forward end portion and a rear end portion operatively associated with a forward end portion of the welding cable; and
a diffuser adapter disposed between the front end portion of the welding cable and the gas diffuser, the diffuser adapter having forward and rear end portions and defining a channel for receiving at least a portion of the gas diffuser and securing the gas diffuser to the welding cable.

18. The cable support assembly according to claim 17, wherein the distal face of the cable support tube abuts against the distal end flange of the insulator sleeve.

19. The cable support assembly according to claim 17, wherein the insulator sleeve includes a cylindrical wall disposed in the cable support tube for insulating the cable support tube from a conductor received in the cylindrical wall, the distal end flange extending from the cylindrical wall and disposed outside the cable support tube.

20. The cable support assembly according to claim 19, wherein the distal end flange has an outside diameter larger than that of the cylindrical wall to define a shoulder.

21. The welding gun according to claim 1, further comprising an insulator sleeve disposed within the forward portion of the cable support tube for insulating the cable support tube from the electrically conductive path in operation.

22. The welding gun according to claim 1, wherein the cable support tube is made of at least one of a copper and a copper alloy.

23. The welding system according to claim 9, further comprising an insulator sleeve disposed within the forward portion of the cable support tube and positioned between the diffuser adapter and the cable support tube for insulating the cable support tube from the electrically conductive path during operation.

* * * * *